United States Patent
Hilden et al.

(10) Patent No.: US 7,021,047 B2
(45) Date of Patent: Apr. 4, 2006

(54) DIESEL EXHAUST AFTERTREATMENT DEVICE REGENERATION SYSTEM

(75) Inventors: David L. Hilden, Shelby Township, MI (US); Chris C. Crellin, Columbus Township, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/897,895

(22) Filed: Jul. 23, 2004

(65) Prior Publication Data

US 2006/0016176 A1    Jan. 26, 2006

(51) Int. Cl.
    *F01N 3/00*    (2006.01)

(52) U.S. Cl. .......................... 60/286; 60/295; 239/128; 239/129

(58) Field of Classification Search ................ 60/286, 60/295, 303; 239/128, 132, 132.3, 533.1, 239/585.1, 129
See application file for complete search history.

(56) References Cited

U.S. PATENT DOCUMENTS

| | | | | |
|---|---|---|---|---|
| 4,538,413 A | * | 9/1985 | Shinzawa et al. | 60/303 |
| 4,955,183 A | * | 9/1990 | Kolodzie et al. | 60/303 |
| 6,021,639 A | * | 2/2000 | Abe et al. | 60/297 |
| 6,401,455 B1 | * | 6/2002 | Mathes et al. | 60/286 |
| 6,530,215 B1 | * | 3/2003 | Alkemade et al. | 60/286 |
| 6,539,708 B1 | * | 4/2003 | Hofmann et al. | 60/286 |
| 6,553,755 B1 | * | 4/2003 | Hofmann et al. | 60/282 |
| 6,814,303 B1 | * | 11/2004 | Edgar et al. | 239/128 |

* cited by examiner

*Primary Examiner*—Tu M. Nguyen
(74) *Attorney, Agent, or Firm*—Kathryn A. Marra

(57) ABSTRACT

A diesel exhaust aftertreatment device regeneration system includes an exhaust conduit adapted to conduct exhaust gas to an exhaust gas aftertreatment device. The system further includes a low pressure bottom feed fuel injector having an inlet portion fully received within a chamber of an adaptor housing having a lower portion attached to the exhaust conduit. The housing is provided with fuel flow openings to allow low pressure fuel to circulate around and cool the fuel injector inlet portion within the chamber. Fuel injected into the exhaust conduit is preferably targeted toward a vaporization member, within the exhaust conduit, operative to absorb heat from the exhaust gas and vaporize fuel deposited thereon. A plurality of inwardly extending mixing baffles within the exhaust conduit intermediate the vaporization member and the aftertreatment device extend the mixing path to improve fuel vaporization for assisting regeneration of the device.

13 Claims, 2 Drawing Sheets

DIESEL EXHAUST AFTERTREATMENT DEVICE REGENERATION SYSTEM

TECHNICAL FIELD

This invention relates to regeneration in operation of exhaust gas aftertreatment devices and, more particularly, to an exhaust fuel injection system for initiating such regeneration.

BACKGROUND OF THE INVENTION

Diesel aftertreatment devices such as catalyzed diesel particulate filters (CDPF) and $NO_x$ adsorber catalysts (NAC) are known in the art for controlling diesel engine emissions. During diesel engine operation, oxides of nitrogen and carbon particulates are produced as byproducts of combustion. These materials are subsequently collected by the NAC and the CDPF. As the oxides of nitrogen and carbon particulates accumulate within these aftertreatment devices, the aftertreatment devices must be regenerated. This is accomplished by reducing the oxides of nitrogen and oxidizing the carbon particulates held by these devices.

NAC devices are commonly regenerated by running the diesel engine rich, a few seconds for every minute of engine operation, to provide reducing agents capable of reducing the oxides of nitrogen stored in the NAC. However, as the engine runs rich, fuel may be wasted and the additional fuel may be completely oxidized or generate excess smoke before the reducing agents are used to regenerate the NAC.

CDPF devices require regeneration at much longer intervals, such as every 200 miles of vehicle operation. Regeneration of a CDPF is usually accomplished by injecting fuel into engine cylinders during their exhaust cycle to form fuel vapors which are carried with exhaust gas for burning in the CDPF. However, depending upon timing and engine operating conditions, the after injected fuel may be completely oxidized or generate smoke before the fuel vapor reaches the CDPF.

A proposed method of regenerating a CDPF is after-injection, which involves injecting low pressure diesel fuel directly into the exhaust downstream of the engine. However, depending on exhaust gas temperatures, injected fuel may not fully vaporize, resulting in the formation of carbon buildup in the exhaust system.

SUMMARY OF THE INVENTION

The present invention provides an improved diesel exhaust aftertreatment device regeneration system, which reduces fuel injector temperatures and improves vaporization of after injected fuel during an aftertreatment regeneration event.

The system includes an exhaust pipe or conduit defining an internal passage for receiving engine exhaust gas and an aftertreatment device, such as a diesel oxidation catalyst (DOC) and a catalyzed diesel particulate filter (CDPF). The exhaust conduit includes an internal fuel vaporization member upstream of the aftertreatment device and a plurality of internal baffles to extend the mixing path and improve fuel vaporization intermediate the vaporization member and the aftertreatment device. The vaporization member is preferably a horizontally extending plate supported within the exhaust conduit by a connecting support. If desired, the plate may have an upturned peripheral rim to temporarily retain unvaporized fuel on the surface of the plate.

An adaptor housing on the conduit forms a chamber open to the internal passage of the conduit and adapted to conduct fuel through the chamber. A lower portion of the adaptor is attached to the exhaust conduit. A low pressure bottom feed fuel injector, having a fuel inlet sealed within the chamber and a spray nozzle aimed into the internal passage, operates to spray diesel fuel into the internal passage at intervals during engine operation. A pair of fuel flow openings defined by the adaptor housing admit pressurized fuel into the chamber to allow circulation of the fuel around the fuel injector inlet portion. The circulated fuel provides cooling for the fuel injector and the housing to absorb heat transferred from the exhaust gases.

A fuel pump draws fuel from a fuel supply such as a vehicle fuel tank to supply pressurized fuel to the housing and the inlet portion of the injector.

An engine control module (ECM), as known in the art, controls fuel delivery through the fuel injector as needed to initiate aftertreatment regeneration.

During engine operation, exhaust gas flowing through the exhaust gas aftertreatment system first heats the vaporization member and then passes through the DOC to the CDPF, in which carbon particulates are trapped while the cleaned exhaust gas passes through. After a period of time or operating interval in which carbon particulates build up in the CDPF, the ECM activates the fuel injector, causing atomized fuel to spray onto the vaporization member. As the atomized fuel sprayed from the injector makes contact with the heated vaporization member, the fuel is vaporized and mixes with the exhaust gas. As the exhaust gas carries the vaporized fuel through the exhaust conduit toward the aftertreatment device, the baffles extend the mixing path and improve fuel vaporization.

The vaporized fuel first contacts the DOC, which initiates oxidation of the vaporized fuel. Heat generated by the oxidized fuel travels through the exhaust gas aftertreatment device and oxidizes carbon collected in the CDPF, thereby regenerating the CDPF. After a predetermined period of time, the controller deactivates the fuel injector to terminate the regeneration event.

These and other features and advantages of the invention will be more fully understood from the following description of certain specific embodiments of the invention taken together with the accompanying drawings.

DESCRIPTION OF THE PREFERRED EMBODIMENT

Figure 1:
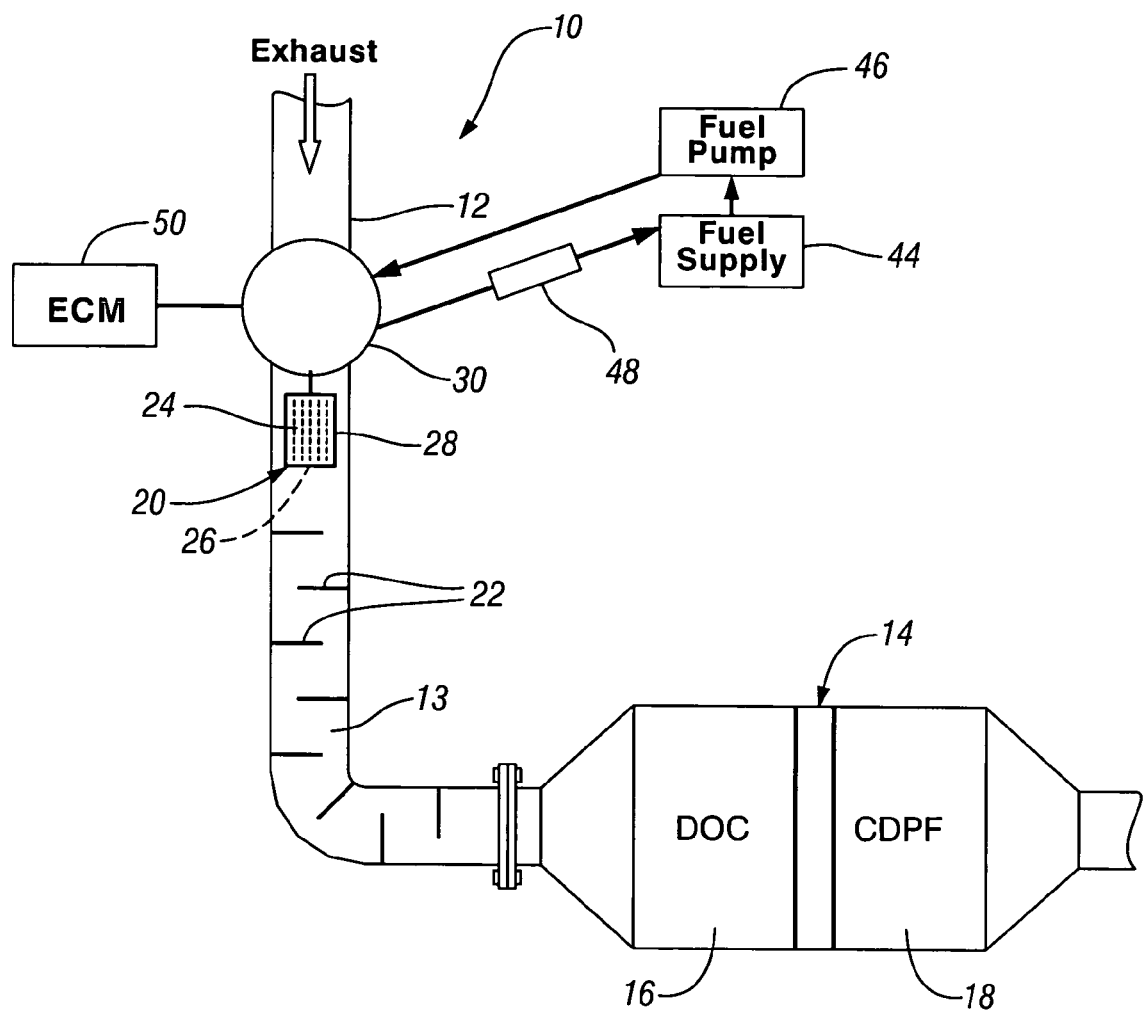
FIG. 1 is a diagrammatic view of an exhaust gas aftertreatment system according to the present invention.

Referring first to FIG. 1 of the drawings in detail, numeral 10 generally indicates a diesel exhaust emission control device regeneration system for regenerating an emission control device in an exhaust system for an internal combustion diesel engine. The system 10 includes an exhaust conduit 12, defining an internal passage 13, adapted to carry exhaust gas to an exhaust gas aftertreatment device 14, such as a diesel oxidation catalyst 16 (DOC) mounted ahead of a catalyzed diesel particulate filter 18 (CDPF). The exhaust conduit 12 includes an internal fuel vaporization member 20 positioned upstream from the aftertreatment device 14 and a plurality of internal baffles 22 intermediate the vaporization member and the aftertreatment device.

The vaporization member 20 is preferably a horizontally extending plate 24 supported within the exhaust conduit 12 by a connecting support 26. If desired, the plate 24 may have an upturned peripheral rim 28 operative to temporarily retain unvaporized fuel on the surface of the plate.

Figure 2:
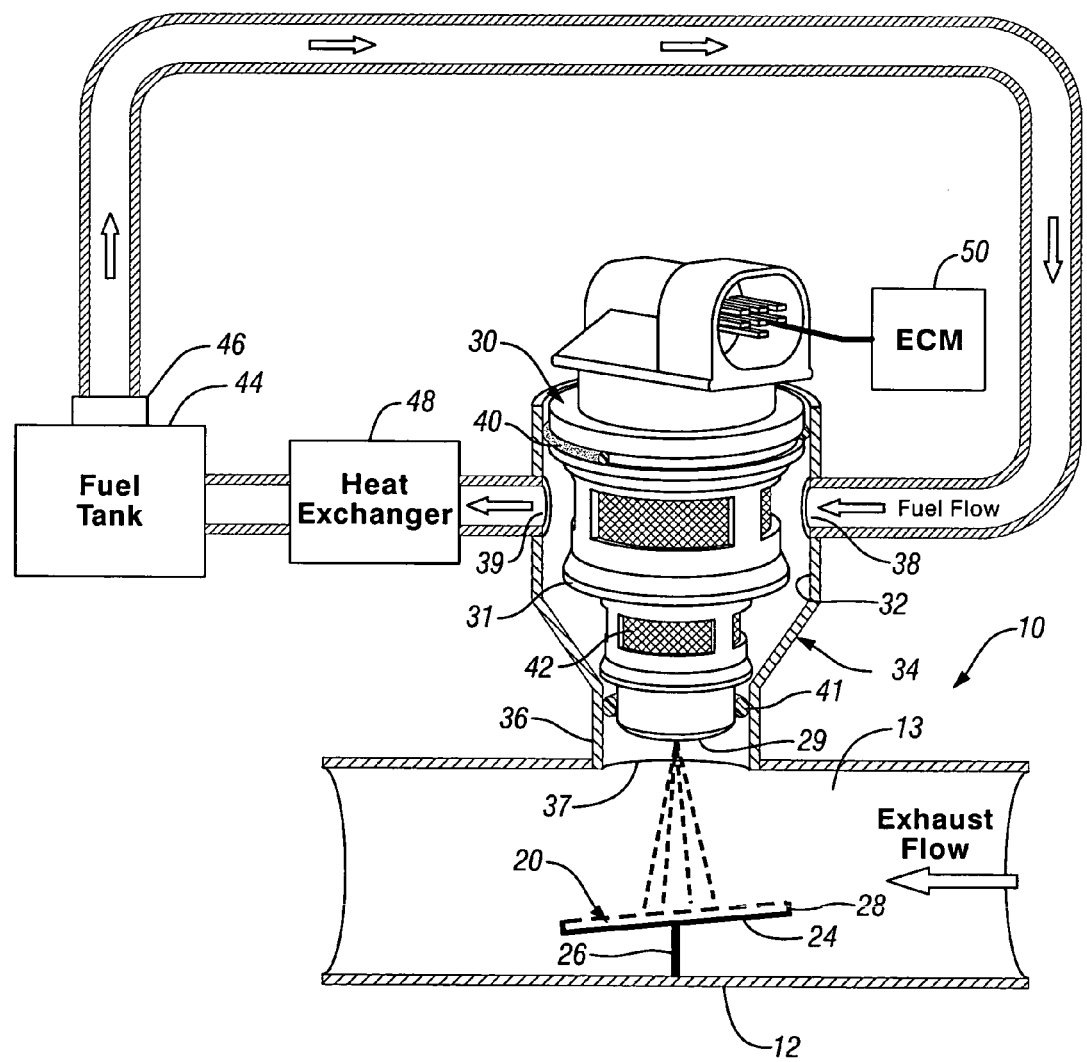
FIG. 2 is a diagrammatic view of a portion of FIG. 1 showing the vaporization member and fuel injector mounting together with an associated fuel supply system.

A nozzle 29 of the low pressure bottom feed fuel injector 30 is positioned to direct diesel fuel spray into the exhaust conduit 12 onto the vaporization member 20, as illustrated in FIG. 2. An inlet portion 31 of the fuel injector 30 is mounted in a chamber 32 of an adaptor housing 34 having a lower portion 36 attached to the conduit 12. The chamber 32 is open to the internal passage 13, through an opening 37 in the conduit. The housing is provided with fuel flow openings 38 and 39, which allow fuel flow into and through the chamber 32.

Upper and lower seals 40, 41 between the injector 30 and the housing 34 prevent leakage of fuel from the chamber 32. The fuel injector 30, mounted in the chamber 32 operates to receive pressurized diesel fuel from the chamber 32 and spray the diesel fuel onto the vaporization member 20 in the internal passage 13 of the conduit 12 at intervals during engine operation. In addition, pressurized fuel circulating through the chamber 32 of the housing provides cooling for the housing and the fuel injector so that its operation is not impaired by hot exhaust gas temperatures.

Pressurized fuel is preferably supplied from a vehicle fuel tank 44. A low pressure fuel pump 46 pumps diesel fuel from the fuel tank 44 and circulates low pressure fuel in a loop through the housing 32 and back to the fuel tank. Low pressure fuel is continuously circulated through the housing 32 and around the fuel injector 30 to cool the fuel injector and the housing. An optional heat exchanger 48 may be installed intermediate the housing 32 and the fuel tank 44 to reduce the temperature of the fuel returned to the fuel tank.

An engine control module (ECM) 50, as known in the art, controls fuel delivery through the fuel injector 30 as needed to initiate aftertreatment regeneration.

During engine operation, exhaust gas is generated during combustion, containing carbon in the form of soot particles. This exhaust gas is subsequently discharged from the engine to the exhaust conduit 12. As the exhaust gas flows through the exhaust conduit 12, heat from the exhaust gas increases the temperature of the vaporization member 20 and the baffles 22. The exhaust gas is further communicated to the aftertreatment device 14 where the carbon particulates are collected by the catalyzed diesel particulate filter 18. Over time, carbon buildup in the diesel particulate filter 18 could cause increased back pressure to impair the operating efficiency of the engine. To avoid this, periodic regeneration of the particulate filter is required.

At predetermined intervals or when signaled by a pressure signal, the engine control module 50 activates the fuel injector 30 to spray fuel onto the vaporization member 20. When the fuel contacts with the heated vaporization member 20, heat from the vaporization member 20 and the surrounding exhaust gases causes the fuel to vaporize and mix with the exhaust gas flowing through the exhaust conduit 12.

When a peripheral rim 28 is present around the plate 24 of the vaporization member 20, the rim aids in retaining unvaporized fuel on the face of the plate to allow additional time for vaporization of the fuel.

The vaporized fuel and unvaporized droplets are then carried with the exhaust gas through the exhaust conduit 12 toward the aftertreatment device 14. As the vaporized fuel is carried through the exhaust conduit 12 the mixing baffles 22 create turbulence, which helps mix the fuel vapor with the exhaust gas. The mixing baffles 22 also extend the path between the vaporization member 20 and the aftertreatment device 14 to allow more time for fuel vaporization.

When the vaporized fuel and the exhaust gas contact the diesel oxidation catalyst 16, the catalyst initiates oxidation of the vaporized fuel, generating heat within the aftertreatment device 14. Heat generated by the oxidized fuel, causes oxidation (burning) of the carbon build up in the catalyzed diesel particulate filter 18, thereby regenerating the particulate filter. After a predetermined period of time, the engine control module 50, deactivates the fuel injector 30 to terminate the regeneration event.

It should be understood, that the regeneration system 10 may be modified and applied to regeneration of other exhaust emission devices, such as a $NO_x$ adsorber catalyst (NAC). In this instance, the fuel injector may be used in conjunction with the vaporization member and the mixing baffles to provide vaporized fuel between the engine and the NAC to reduce oxides of nitrogen collected by the NAC during engine operation.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A diesel exhaust aftertreatment device regeneration system comprising:
   an exhaust conduit defining an internal passage connected to carry engine exhaust gas to a downstream aftertreatment device;
   an adaptor housing on the conduit and forming a chamber open to the passage, the housing having a lower portion attached to the exhaust conduit and adapted to conduct fuel through the chamber; and
   a bottom feed fuel injector having an injection fuel inlet sealed within the chamber and feeding a spray nozzle aimed into the internal passage, the fuel injector positioned to be cooled by recirculating fuel flow through the housing and being operable to spray diesel fuel into the internal passage at intervals during engine operation;
   whereby the fuel sprayed into the internal passage is vaporized by hot exhaust gas and carried to the aftertreatment device for assisting regeneration of the device.

2. A system as in claim 1 wherein the injection fuel inlet is connected with the spray nozzle for delivering fuel into the internal passage of the exhaust conduit and the adaptor also includes separate fuel openings positioned within the chamber for carrying the recirculating fuel flow through the housing for cooling the injector within the chamber.

3. A system as in claim 1 including a vaporization member positioned within the exhaust conduit to intercept fuel sprayed into the internal passage, the member being operative to absorb heat from the exhaust gas for vaporizing fuel deposited on the member.

4. A system as in claim 3 including a plurality of inwardly extending mixing baffles within the exhaust conduit intermediate the vaporization member and the aftertreatment device and operative to extend the internal passage to improve fuel vaporization.

5. A diesel exhaust aftertreatment device regeneration system comprising:

an exhaust conduit adapted to receive engine exhaust gas and connected to carry the exhaust gas downstream to an exhaust gas aftertreatment device;

a vaporization member mounted within the exhaust conduit and operative to absorb heat from the exhaust gas to vaporize fuel deposited thereon; and a fuel injector operable during engine operation to spray diesel fuel intermittently onto the vaporization member in the exhaust conduit;

whereby fuel injected onto the vaporization member is vaporized by the exhaust heat and is carried to the exhaust gas aftertreatment device for assisting regeneration of the device.

6. A system as in claim 5 including a plurality of inwardly extending mixing baffles within the exhaust conduit intermediate the vaporization member and the aftertreatment device and operative to extend the mixing path to improve fuel vaporization.

7. A system as in claim 5 including a controller operative to control fuel injection by the fuel injector.

8. A system as in claim 5 wherein the fuel injector is an electronically controlled bottom feed injector.

9. A system as in claim 8 wherein the fuel injector has a fuel inlet sealingly received within a housing having a lower portion attached to the exhaust conduit and fuel flow openings to admit pressurized fuel to and allow circulation of the fuel around the injector fuel inlet for cooling the injector.

10. A system as in claim 5 wherein the vaporization member is a plate extending longitudinally within the exhaust conduit and supported within the exhaust conduit by a connecting support.

11. A system as in claim 10 wherein the plate is generally horizontal and has a raised peripheral rim for temporarily retaining liquid fuel.

12. A system as in claim 10 wherein the plate is generally horizontal.

13. A diesel exhaust aftertreatment device regeneration system comprising:

an exhaust conduit adapted to receive engine exhaust gas and connected to carry the exhaust gas downstream to an exhaust gas aftertreatment device;

a vaporization member mounted within the exhaust conduit and operative to absorb heat from the exhaust gas to vaporize fuel deposited thereon; and a fuel injector operable during engine operation to spray diesel fuel intermittently onto the vaporization member in the exhaust conduit;

whereby fuel injected onto the vaporization member is vaporized by the exhaust heat and is carried to the exhaust gas aftertreatment device for assisting regeneration of the device; and wherein the vaporization member is a plate extending longitudinally within the exhaust conduit and supported within the exhaust conduit by a connecting support and the plate is generally horizontal and has a raised peripheral rim for temporarily retaining liquid fuel.

* * * * *